W. BRAMHAM.
SHOCK ABSORBER.
APPLICATION FILED AUG. 9, 1913.
1,101,614.
Patented June 30, 1914.
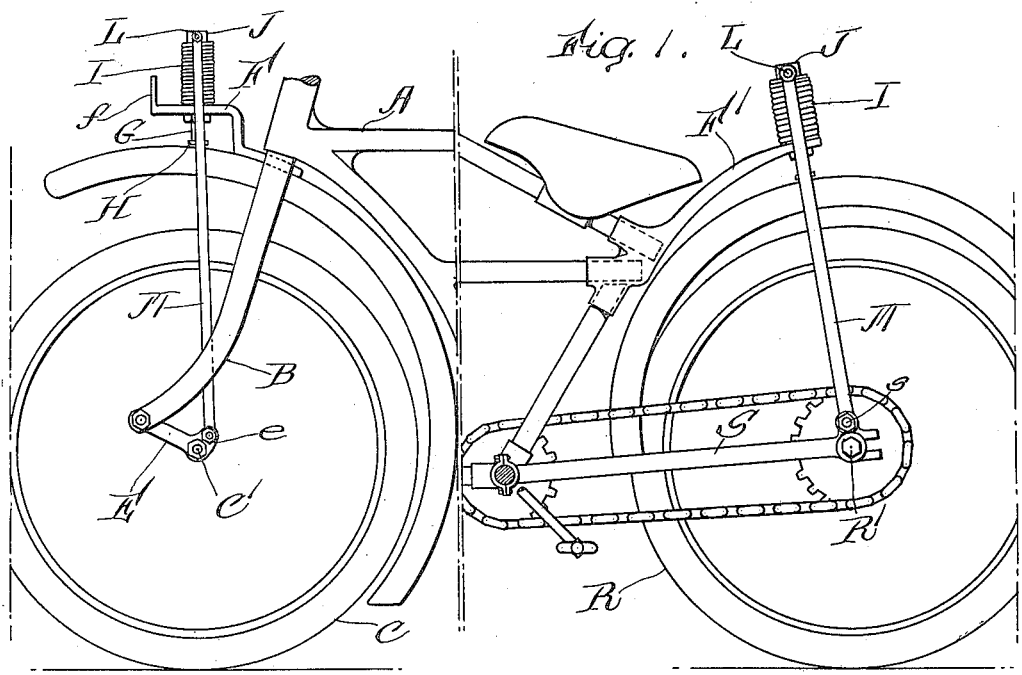
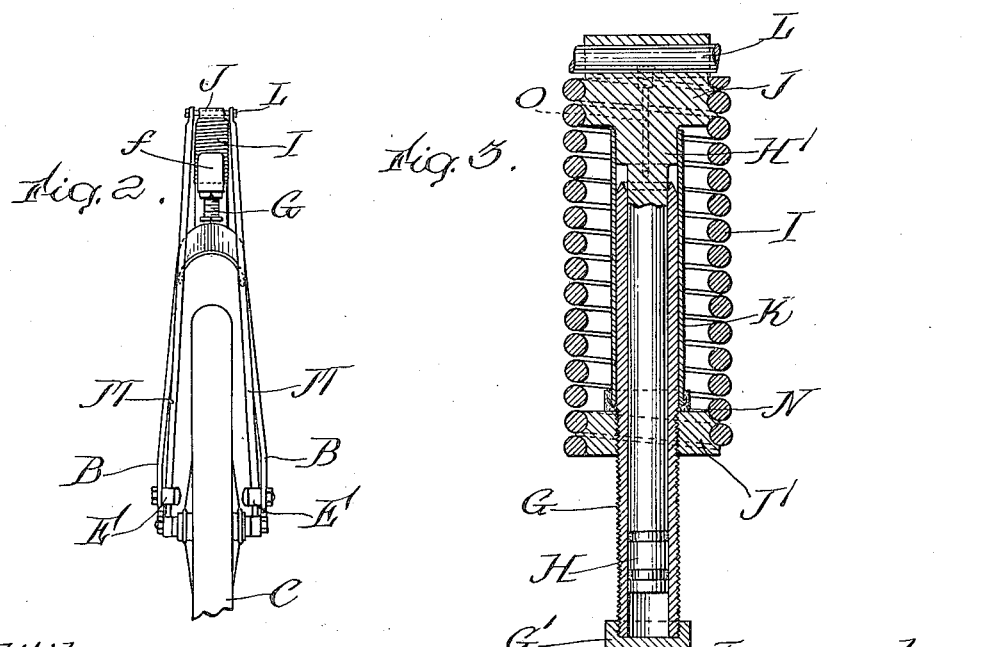

UNITED STATES PATENT OFFICE.

WILFRED BRAMHAM, OF BEVERLY, MASSACHUSETTS.

SHOCK-ABSORBER.

1,101,614.  Specification of Letters Patent.  Patented June 30, 1914.

Application filed August 9, 1913. Serial No. 783,853.

*To all whom it may concern:*

Be it known that I, WILFRED BRAMHAM, a citizen of the United States, and resident of Beverly, in the county of Essex and State of Massachusetts, have invented new and useful Improvements in Shock-Absorbers, of which the following is a specification.

My invention relates to shock absorbers for vehicles and constitutes an improvement upon the spring attachment or shock absorber shown and described in Letter's Patent of the United States, No. 972,806, granted to me October 18, 1910. While the device shown in my said patent has proved in actual service wholly adequate for the purpose for which it was designed, it is believed that the present invention possesses advantages over the shock absorber shown and described in my former patent, which will be apparent to those skilled in the art.

The present invention like that shown and described in my said former patent is peculiarly adapted for use in combination with the frame and wheels of a motor cycle to obviate the violent shocks and jars incident to the riding of such vehicles even on ordinary roads. The description will therefore be addressed to its use in this environment, it being understood that the invention is by no means limited to such specific use.

Referring to the drawings which illustrate an embodiment of my invention,—Figure 1 is a side elevation of a motor cycle partly broken away and showing my improved shock absorber in combination with both the front and rear wheels; Fig. 2 is a front view of the same; and Fig. 3 is an enlarged sectional view of the spring and cushion device hereinafter described.

My invention may be used in combination with either or both wheels of a motor cycle or other vehicle, and in the drawings I have illustrated it in combination with both the front and rear wheels. For the sake of clearness I will first describe it in combination with the front wheel.

A is the frame having the usual fork B extending on opposite sides of the front wheel C and having a mutually pivotal connection with the axle C' of said wheel through the pivoted arms E.

F is a bracket rigidly secured to the frame A and preferably provided with an upturned end $f$ adapted to serve as a lantern holder. Upon said bracket F and passing therethrough there is fixed a hollow, air tight, tube or cylinder G, screw-threaded for a portion of its length and closed at its bottom by a removable cap G'. Within said tube or cylinder G and projecting therefrom is a reciprocating plunger H having a spring holder J at its top, to which is secured one end of a tension spring I, preferably a tension coiled spring as shown, the other end thereof being secured to a spring holder J' adjustably mounted on the screw-threaded portion of said cylinder G whereby the tension of the spring may be adjusted to suit the individual user. It will be observed that when the plunger H is in its normal position shown in Fig. 3, it does not completely fill said cylinder, so that there is left at the bottom an air space which acts as an air cushion to prevent the shock of the recoil of the spring. To prevent the entrance of dirt, dust, etc., into said cylinder, there is provided a light sleeve or shell K secured to the projecting portion of said plunger and extending around said cylinder in sliding engagement therewith. Preferably said sleeve or shell K is driven onto an enlargement H' formed upon the plunger H, and is provided with a washer W of felt or the like at its lower end. Oil holes for the passage of lubricant into the cylinder G are provided, as shown at O, and the top of said cylinder is preferably beveled, as shown, readily to receive said oil. To the top of said spring holder J there is secured, as by the bolt L, a pair of rods M, forming in effect a fork, which extend upon opposite sides of the wheel and are pivotally secured at their lower ends to lugs or ears $e$ on the arms E.

Referring now to the combination of my improved shock absorber with the frame and rear wheel R of the motor cycle, F' is a bracket rigidly secured to the frame A, upon which is mounted the cylinder G, plunger H, spring I, etc., already described as mounted upon the bracket F. The axle of the wheel R' is adjustably secured in the arms S which are pivotally secured to the frame A and extend on opposite sides of the wheel R. The rods or fork M which are bolted at the top of the spring holder J extend on opposite sides of the wheel and are pivotally secured at their lower ends to lugs or ears $s$ upon the arms S. Normally the parts are in the position shown in Figs. 1 and 3, the coils of the springs being closed and the plunger at its lowermost position.

When the rider mounts the machine and is seated thereon, his weight added to that of the frame expands the springs I, lifts the plunger in its cylinder, and the frame and rider are suspended on said springs. When now the wheel strikes against an obstacle in its path or travels over an uneven road surface, the axles are lifted, causing the rods or fork M to push upward, thus expanding the springs I and lifting the plungers H, thus causing a gentle up-and-down movement of the frame and its rider, as the springs expand and contract, the reciprocation of the plunger in the cylinder aiding the springs in obviating the shock of the blow. It will be observed that the plunger H not only serves the purpose of aiding the springs in taking up the shock, but also performs the function of a guide rod to insure the vertical position of the spring I and guide it in its movement. It will further be observed that as the arms S have a pivotal connection with the frame and therefore rise and fall with the axle, the tension of the sprocket chain is unaffected by the up-and-down movement.

A shock absorber constructed in accordance with my invention herein described, possesses all the advantages resulting from the use in this environment of a spring under tension as distinguished from springs held under compression as fully explained in my said Patent No. 972,806. In addition the provision of means to lessen the shock of the recoil of the spring renders the up-and-down movement of the frame very gentle, thus insuring the safety, ease and comfort of the rider.

I claim:

1. In a vehicle, in combination, a frame, a wheel and its axle, a pivotal connection between said frame and said axle, an air tight cylinder mounted on said frame provided with a plunger, a tension spring secured at its lower end to said frame and at its upper end to said plunger, and a fork extending on opposite sides of said wheel and connecting the top of said spring with said axle.

2. In a vehicle, in combination, a frame, a wheel and its axle, a pivotal connection between said frame and said axle, a bracket on said frame, an air tight cylinder vertically mounted on said bracket and having a plunger provided at its top with a spring holder, a tension spring surrounding said cylinder secured at its top to said spring holder and at its bottom to said bracket, and a fork extending on opposite sides of said wheel and connecting the top of said spring with said axle.

3. In a vehicle, in combination, a frame, a wheel and its axle, a pivotal connection between said frame and said axle, a bracket on said frame, an air tight cylinder vertically mounted on said bracket and having a plunger provided at its top with a spring holder, a dust protecting shell fast on said plunger and in sliding engagement with said cylinder, a tension spring secured at its top to said spring holder and at its bottom to said bracket, and a fork extending on opposite sides of said wheel and connecting the top of said spring with said axle.

4. In a vehicle, in combination, a frame, a wheel and its axle, pivoted arms connecting said frame and said axle, a bracket on said frame, an air tight cylinder vertically mounted on said bracket and having a plunger provided at its top with a spring holder, a dust protecting shell fast on said plunger and in sliding engagement with said cylinder, a tension spring secured at its top to said spring holder and at its bottom to said bracket, a pair of rods fast to the top of said spring holder, extending on opposite sides of said wheel, and secured at their bottoms to said pivoted arms.

Signed by me at Beverly, Massachusetts this 6th day of August, 1913.

WILFRED BRAMHAM.

Witnesses:
CHARLES D. WOODBERRY,
JOSEPHINE H. RYAN.